(12) United States Patent
Chen

(10) Patent No.: US 9,021,665 B2
(45) Date of Patent: May 5, 2015

(54) ELASTIC ZIP TIE

(71) Applicant: Kevin Fong Chen, Anaheim, CA (US)

(72) Inventor: Kevin Fong Chen, Anaheim, CA (US)

(*) Notice: Subject to any disclaimer, the term of this patent is extended or adjusted under 35 U.S.C. 154(b) by 86 days.

(21) Appl. No.: 13/971,327

(22) Filed: Aug. 20, 2013

(65) Prior Publication Data

US 2013/0333163 A1 Dec. 19, 2013

Related U.S. Application Data

(63) Continuation-in-part of application No. 13/314,197, filed on Dec. 8, 2011, now abandoned, and a continuation-in-part of application No. 13/006,423, filed on Jan. 14, 2011, now abandoned.

(30) Foreign Application Priority Data

Jan. 18, 2011 (TW) .............................. 100101754 A

(51) Int. Cl.
| | |
|---|---|
| B65D 63/10 | (2006.01) |
| B29C 47/00 | (2006.01) |
| B29K 7/00 | (2006.01) |
| B29K 21/00 | (2006.01) |
| B29K 23/00 | (2006.01) |
| B29K 27/06 | (2006.01) |

(52) U.S. Cl.
CPC ......... B65D 63/1081 (2013.01); *Y10T 24/1498* (2015.01); B29C 47/003 (2013.01); *B29K 2007/00* (2013.01); *B29K 2021/00* (2013.01); *B29K 2023/06* (2013.01); *B29K 2023/0633* (2013.01); *B29K 2023/065* (2013.01); *B29K 2027/06* (2013.01); *B29C 2793/009* (2013.01); *B65D 63/1027* (2013.01); *B65D 2563/103* (2013.01); *B65D 2563/107* (2013.01)

(58) Field of Classification Search
CPC . B65D 63/1081; B65D 63/1027; F16L 3/233; F16L 3/2336; A45C 13/30; A45F 3/14
USPC .......................... 24/16 R, 16 PB, 17 AP, 17 A
See application file for complete search history.

(56) References Cited

U.S. PATENT DOCUMENTS

| | | | | | |
|---|---|---|---|---|---|
| 3,072,986 | A | * | 1/1963 | Lefnaer ........................ | 24/16 PB |
| 3,855,670 | A | * | 12/1974 | Brudy ........................... | 24/16 PB |
| 3,973,610 | A | * | 8/1976 | Ballin ............................. | 383/71 |
| 5,295,285 | A | * | 3/1994 | Shely ........................... | 24/16 PB |
| 5,396,684 | A | * | 3/1995 | Yocom ......................... | 24/16 PB |
| 5,799,376 | A | * | 9/1998 | Harsley ........................ | 24/16 PB |
| 6,681,451 | B1 | * | 1/2004 | Adams et al. ................ | 24/16 PB |

* cited by examiner

*Primary Examiner* — Robert J Sandy
*Assistant Examiner* — David Upchurch
(74) *Attorney, Agent, or Firm* — C. G. Mersereau; Nikolai & Mersereau, P.A.

(57) ABSTRACT

An elastic zip tie is integrally molded from foam rubber, and includes a long strip of strap, a head located at a front end of the strap, and a plurality of flexible grips axially spaced on an upper and a lower surface of the strap. At least one holding space is defined by between any two adjacent axially-spaced flexible grips. The head has a thickness defined between two lateral sides thereof and is substantially larger than a longitudinal length of the holding space, i.e., a distance between two adjacent flexible grips. When a tail end of the strap is extended through the head for the latter to rest on the strap in a selected holding space, the flexible grips located immediately before and behind the holding space are elastically pressed against the two opposite lateral sides of the head to thereby firmly hold the latter in the holding space.

16 Claims, 14 Drawing Sheets

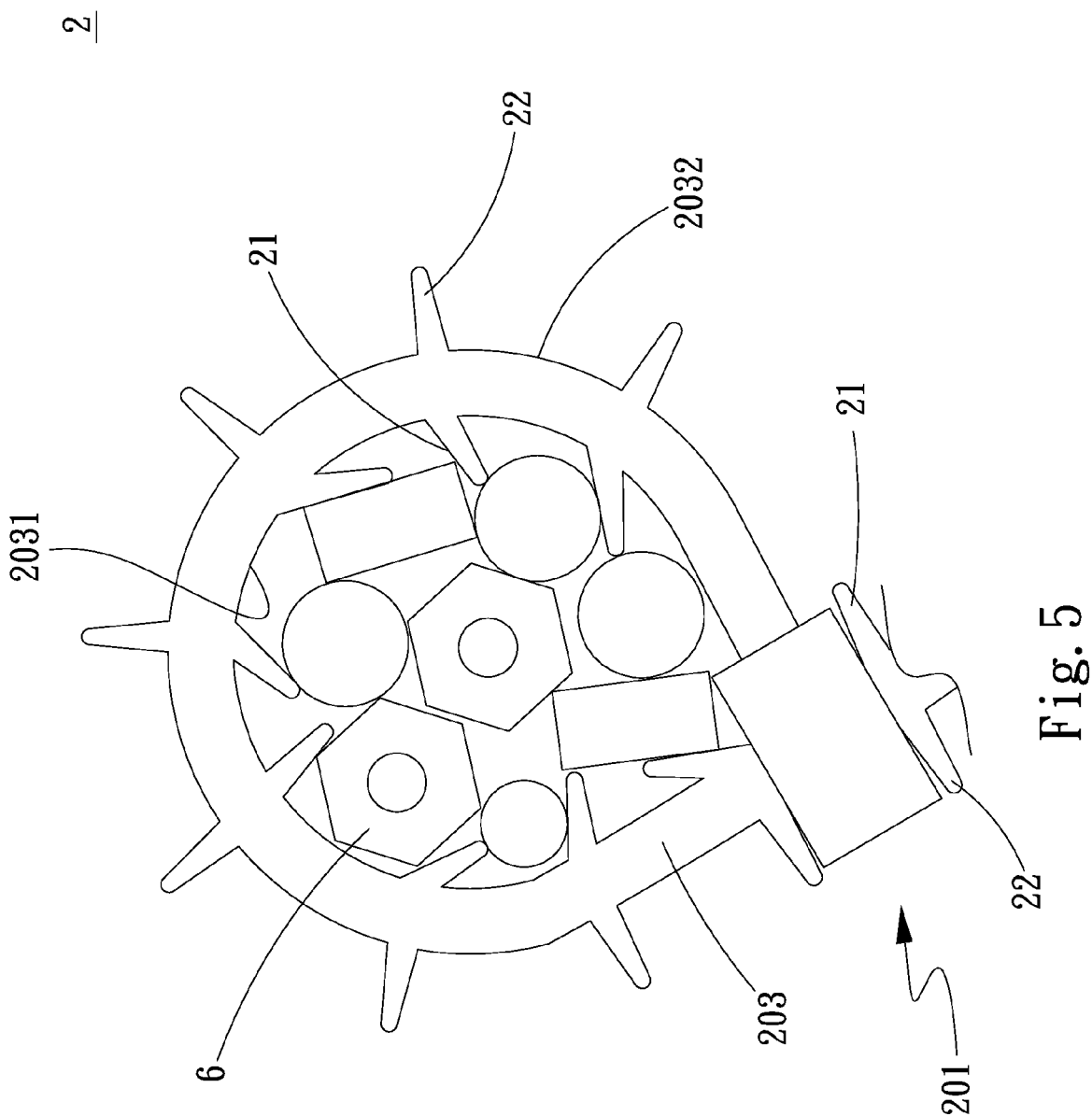

ELASTIC ZIP TIE

CROSS-REFERENCE TO RELATED APPLICATIONS

The present application is a continuation-in-part of U.S. patent application Ser. No. 13/006,423, filed on Jan. 14, 2011, titled Tie Strap Structure, listing Kevin Fong Chen as inventor and is a continuation-in-part of U.S. patent application Ser. No. 13/314,197, filed on Dec. 8, 2011, titled Tie Manufacturing Method, also listing Kevin Fong Chen as inventor. Both of the above applications are incorporated herein by reference in their entirety.

FIELD OF THE INVENTION

The present invention relates to an elastic zip tie, and more particularly to a multifunctional zip tie that is more convenient for use, reusable, cost-saving and environmentally friendly.

BACKGROUND OF THE INVENTION

A zip tie is frequently used by people in their daily life to bundle or organize different objects, such as electrical wires, cables or other miscellaneous items, and has a wide variety of other applications.

Please refer to FIG. 1A that is a perspective view of a first conventional zip tie consisting of a retaining head 10 and a long strip of strap 11. The retaining head 10 has a slot 101 with a pawl 103. The strap 11 is formed on one surface with a plurality of axially spaced teeth 112 for engaging with the pawl 103. To use the zip tie, simply extend the strap 11 around the objects to be bundled or organized before inserting a tail end of the strap 11 into the slot 101 of the retaining head 10, and then pull the strap 11 through the slot 101 to tighten the strap 11 against the bundled objects. At this point, the pawl 103 in the slot 101 of the retaining head 10 finally immovably engages with one of the teeth 112 on the strap 11 to achieve the purpose of bundling the objects.

While the above-described conventional zip tie can be used to bundle objects quickly, it has some disadvantages in use. That is, once the strap 11 has been pulled through the slot 101 to tighten against the bundled objects, the pawl 103 is irreversibly engaged with one of the teeth 112. To loosen the strap 11 from the bundled objects, a cutting device must be used to cut open the looped strap 11, rendering the zip tie no longer usable. Thus, the conventional zip tie shown in FIG. 1A tends to cause resource wastage and increased material cost, and is therefore not environmentally friendly.

In addition, since the conventional zip tie shown in FIG. 1A is not automatically or freely adjustable in tightness, there is a safety risk in using such zip tie. For example, there are times a user carelessly gets his or her finger pinched in the objects bundled with the zip tie, which could not be loosened or released from the bundled objects immediately. When a knife is used to cut open the strap 11 of the zip tie, it is very possible the user's finger is undesirably injured by the knife. In some worse conditions, a user, particularly a child, uses or plays the zip tie in an incorrect manner and carelessly binds it around the user's body part, such as the neck or a finger, which might become necrotized to even cause death of the user if the zip tie is not timely loosened.

To overcome the above-mentioned disadvantages of the first conventional zip tie in use, another releasable zip tie, as shown in FIGS. 1B and 1C, has been developed. The releasable zip tie includes a retaining head 10 with a slot 101, a strap 11, and a release member 13. The release member 13 includes a pawl end 131 and a push end 132 extended from and located opposite to the pawl end 131. The pawl end 131 is located in the slot 101 and can be released from the slot 101 by pushing the push end 132. The strap 11 is formed on one surface with a plurality of axially spaced teeth 112 for engaging with the pawl end 131. To use the zip tie, simply extend the strap 11 around the objects to be bundled or organized, such as electric wires, cables and other miscellaneous items, before inserting a tail end of the strap 11 into the slot 101 of the retaining head 10, and then pull the strap 11 through the slot 101 to tighten the strap 11 against the bundled objects. At this point, the pawl end 131 of the release member 13 is located in the slot 101 of the retaining head 10 and finally immovably engages with one of the teeth 112 on the strap 11 to achieve the purpose of bundling the objects. When it is desired to loosen the strap 11 from the bundled objects, a user may push the push end 132 with a fingernail or a tool tip to move the pawl end 131 away from the engaged tooth 112 and then backward pull the strap 11 out of the slot 101 to achieve the purpose of releasing the bundled objects.

While the above-described releasable zip tie as shown in FIGS. 1B and 1C serves to releasably bind a bundle of objects, the release member 13 thereof is not so convenient to operate or safe for use because the user has to continuously push his or her fingernail or the tool tip against the considerably small push end 132 before the strap 11 can be completely removed from the slot 101. The user would get a sore hand from pushing against the push end 132 over an extended time period. In addition, the provision of the release member 13 also increases the manufacturing cost of the zip tie.

Another disadvantage of the conventional zip ties is that the strap 11 is not elastically stretchable and accordingly, not suitable for firmly binding or bundling soft objects, such as hair, packaging bags, carry bags, and many other soft articles with irregular shapes. The non-elastic zip tie can only be loosely wound around the above-mentioned soft articles without tightly holding them in place. Thus, the conventional zip ties are suitable only for bundling rigid articles, such as wires, cables and the like.

In brief, the conventional zip ties have the following disadvantages: (1) inconvenient to operate; (2) not allowing the user to freely adjust the tightness of the zip tie against the bundled objects; (3) not reusable; (4) causing cost wastage; and (5) not safe for use.

It is therefore tried by the inventor to develop an improved elastic zip tie to overcome the drawbacks of the conventional zip ties.

SUMMARY OF THE INVENTION

A primary object of the present invention is to provide an elastic zip tie, which has a strap provided with a plurality of axially spaced flexible grips and a head located at a front end of the strap and provided with an opening. Unlike the conventional zip ties that use a retaining head to fasten the strap thereto, the strap of the elastic zip tie of the present invention has a tail end for extending through the opening of the head, so that the head can be firmly held to the strap by and between any two adjacent flexible grips.

Another object of the present invention is to provide an elastic zip tie, which is integrally molded from foam rubber to internally contain a plurality of micropores and is therefore stretchable, twistable and elastically restorable for reuse. The elastic zip tie of the present invention is also pliable, compressible and springy, and is therefore useful in buffering or absorbing shock to protect objects bundled with the elastic zip tie against surface damage.

A further object of the present invention is to provide an elastic zip tie that includes a strap provided with a plurality of paired bendable and elastically restorable flexible jaws, which help in firmly holding the bundled objects in place and prevent them from slipping.

A still further object of the present invention is to provide an elastic zip tie, outer surfaces of which are formed into a solid rubber surface skin suitable for printing, writing or marking for identification purpose.

To achieve the above and other objects, the elastic zip tie according to one aspect of the present invention includes a strap, a plurality of flexible grips, and a head. The strap has a width and a length selected according to actual need in use, and a front end and an opposite tail end. The flexible grips are axially spaced on the strap in a longitudinal direction thereof, and each of the flexible grips includes a pair of flexible jaws, which are projected from two opposite surfaces of the strap, such that at least one holding space is defined by between any two adjacent ones of the axially-spaced flexible grips, and the holding space each has a longitudinal length defined by a distance between the two adjacent flexible grips. The head is integrally formed at the front end of the strap and has two opposite lateral sides, which together define a head thickness between them, and the head thickness is substantially larger than the longitudinal length of the holding space. The head has an opening extended through the head in its thickness direction for the tail end of the strap to extend therethrough, so that the head can be rested on the strap in a selected holding space with the two opposite lateral sides of the head being pressed by between two pairs of flexible jaws constituting the two flexible grips immediately located before and behind the holding space, making the head firmly held in the holding space.

To achieve the above and other objects, the elastic zip tie according to another aspect of the present invention includes a strap, a plurality of flexible grips, and a head. The strap has a width and a length selected according to actual need in use, a front end and an opposite tail end, and an upper surface and an opposite lower surface extended between the front end and the tail end. The flexible grips are axially spaced on the strap in a longitudinal direction thereof. Each of the flexible grips includes a first flexible jaw, which is projected from the upper surface of the strap, and a second flexible jaw, which is projected from the lower surface of the strap. A first holding space is defined by between any two axially adjacent ones of the first flexible jaws, and the first holding space each has a longitudinal length defined by a distance between the two adjacent first flexible jaws; and a second holding space is defined by between any two axially adjacent ones of the second flexible jaws, and the second holding space each has a longitudinal length defined by a distance between the two adjacent second flexible jaws. The head is integrally formed at the front end of the strap and has a first lateral side and an opposite second lateral side, which together define a head thickness between them. The head thickness is substantially larger than the longitudinal length of the holding space. The head has an opening extended through the head in its thickness direction for the tail end of the strap to extend therethrough, so that the head can be rested on the strap in a pair of first and second holding spaces defined between two selected adjacent ones of the flexible grips, such that the opposite first and second lateral sides of the head are pressed by between the two pairs of first and second flexible jaws constituting the two selected adjacent flexible grips, making the head firmly held in the paired first and second holding spaces.

According to the present invention, the strap, the flexible grips and the head of the elastic zip tie are integrally molded from foam rubber, so that the elastic zip tie is an elastomeric product internally containing a plurality of micropores.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIG. 5 shows objects bundled with the elastic zip tie of the present invention are firmly held in place and prevented from slipping by the flexible grips that are bendable and elastically restorable;

DETAILED DESCRIPTION OF THE PREFERRED EMBODIMENTS

Figure 1A:
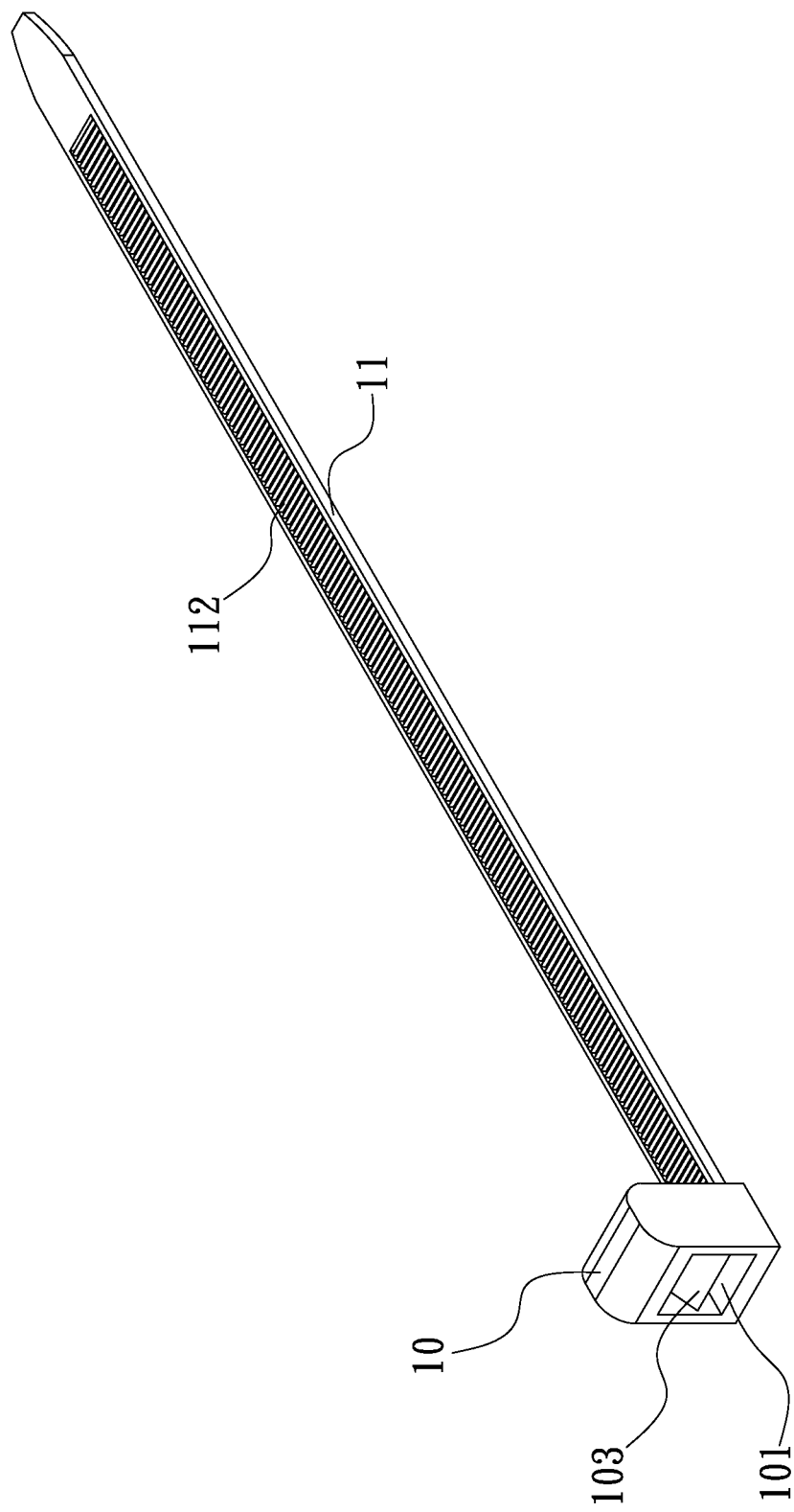
FIG. 1A is a perspective view of a first conventional zip tie.
Figure 1B:
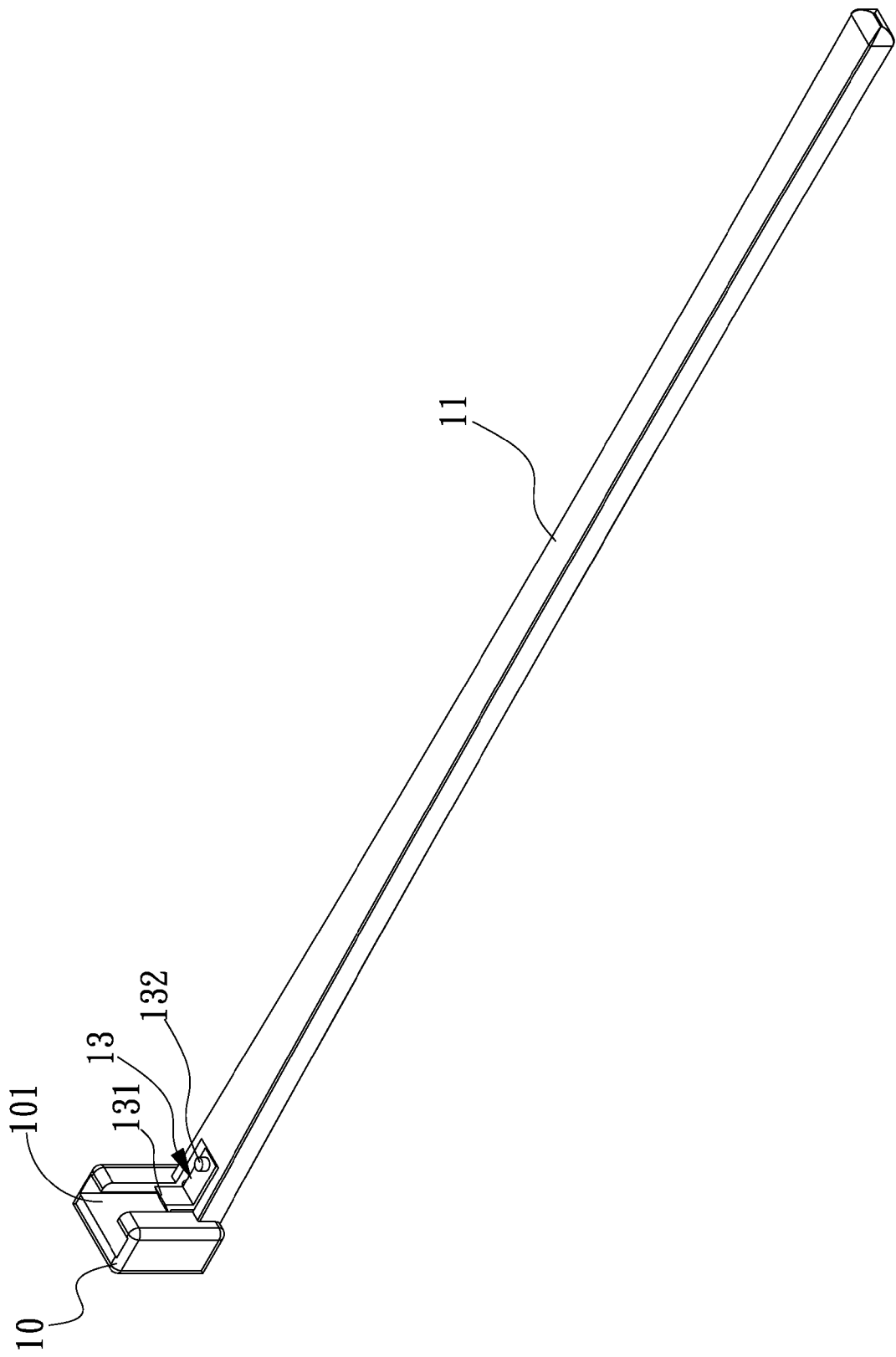
FIG. 1B is a perspective view of a second conventional zip tie.
Figure 1C:
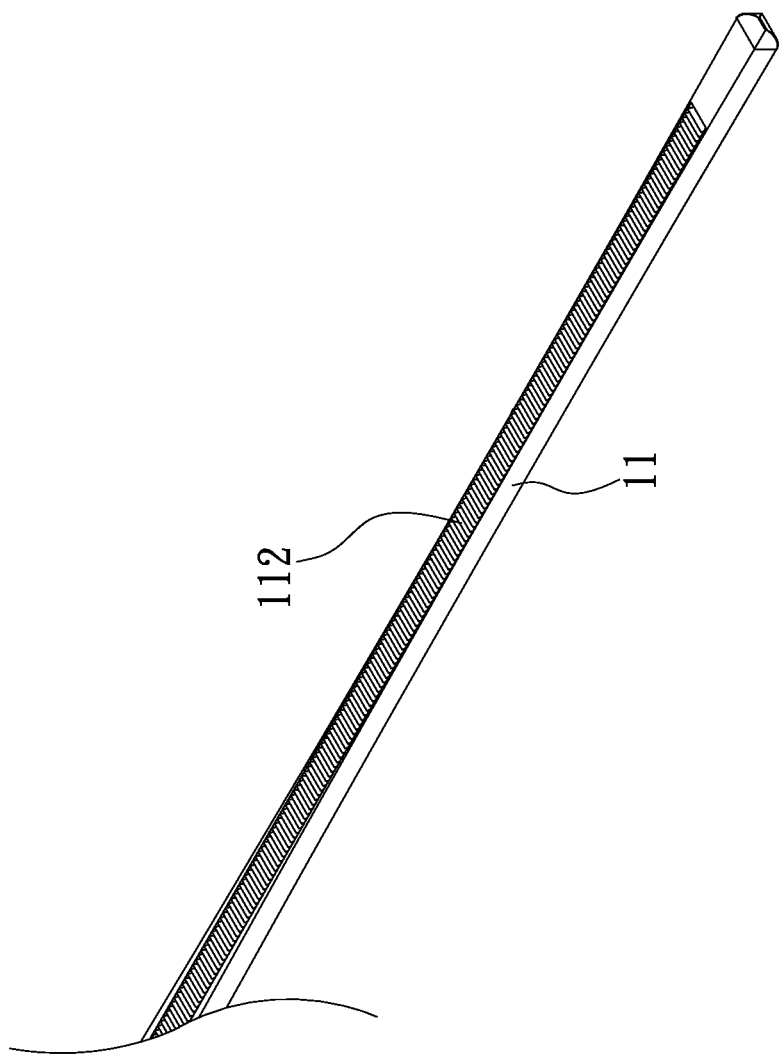
FIG. 1C is another perspective view of the zip tie of FIG. 1B.

The present invention will now be described with some preferred embodiments thereof and with reference to the accompanying drawings. For the purpose of easy to understand, elements that are the same in the preferred embodiments are denoted by the same reference numerals.

Figure 2A:
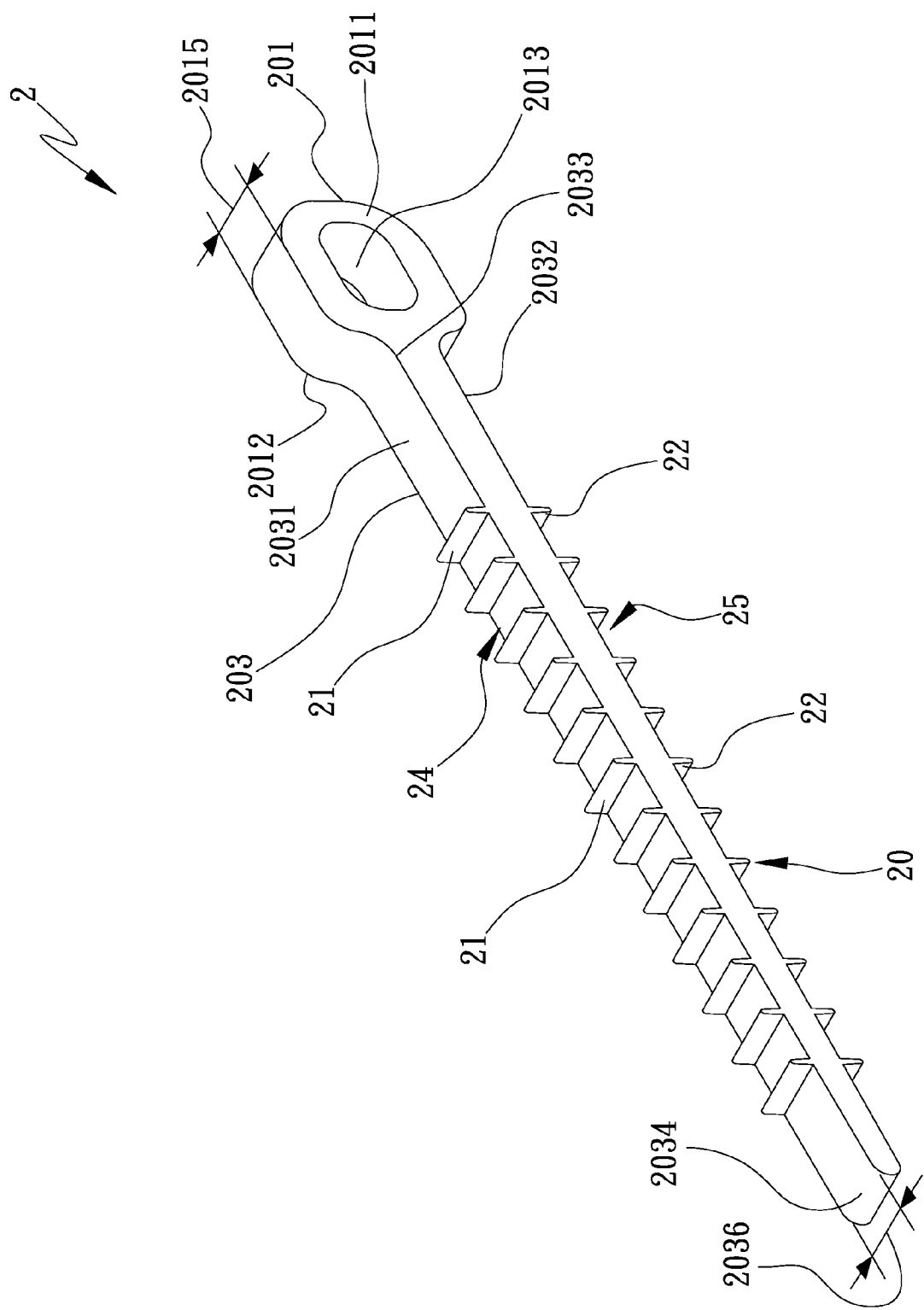
FIG. 2A is a perspective view of an elastic zip tie according to a first preferred embodiment of the present invention.
Figure 2B:
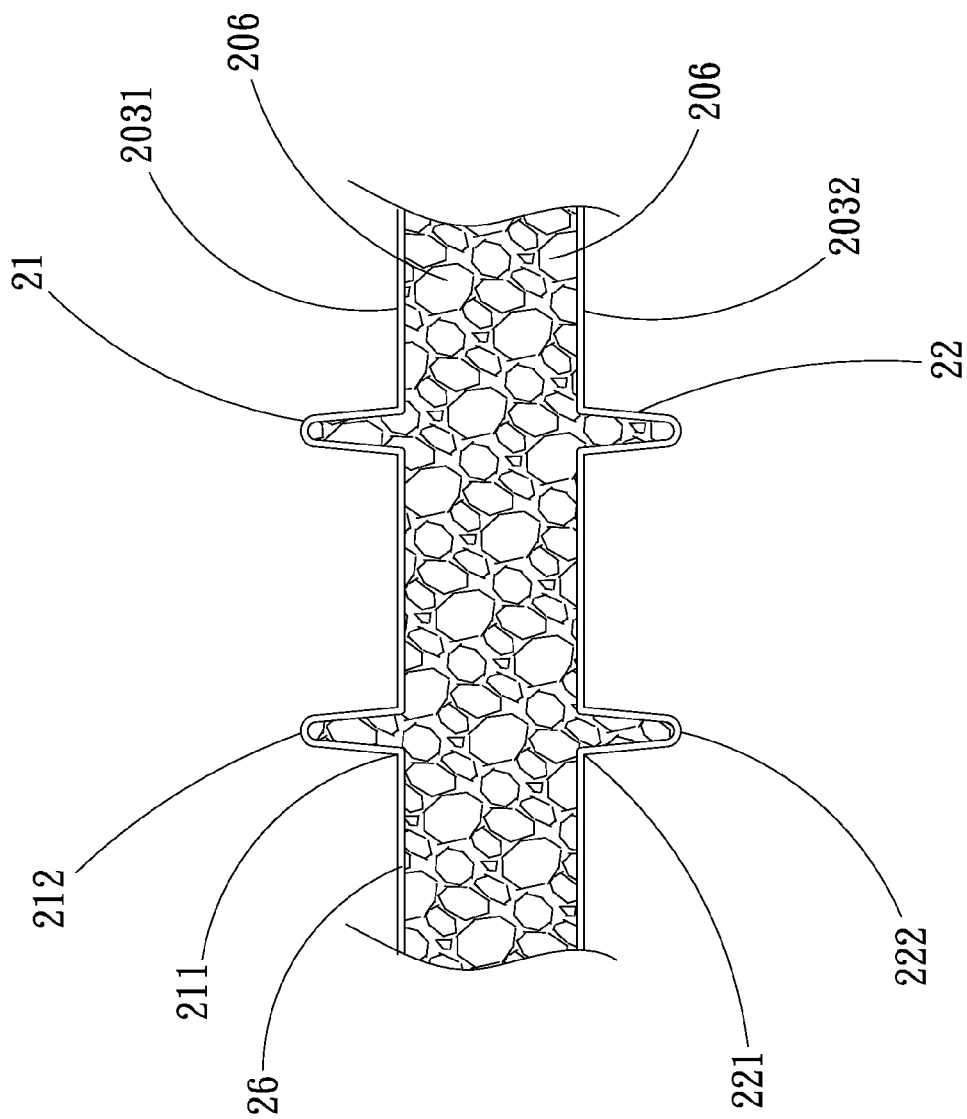
FIG. 2B is a fragmentary longitudinal sectional view of FIG. 2A.

Please refer to FIGS. 2A and 2B that are perspective and fragmentary longitudinal sectional views, respectively, of an elastic zip tie 2 according to a first preferred embodiment of the present invention. As shown, the elastic zip tie 2 includes a strap 203, a head 201 and a plurality of flexible grips 20, and is an elastomeric product integrally molded from foam rubber to have a plurality of micropores 206 therein.

Foam rubber is a porous material with high elasticity to provide increased flexibility and pliability, enhanced buffering and shock-absorbing effect, good thermal and acoustic isolation, as well as good sound absorbency, and is comfortable to the touch. The larger the size of the micropores 206 and the wider the micropore-size distribution, the better the stretchability of the foam rubber is. The foam rubber has a storage modulus that decreases with increasing average micropore density of the foam rubber and increases with increasing average micropore area. By storage modulus, it means a number that indicates the degree by which a material can restore after being deformed. Among others, the micropores 206 have particular contribution to the buffering and shock-absorbing effect of the foam rubber.

Generally speaking, the foam rubber is composed of a rubber raw material, calcium and carbon containing compounds, fillers and additives. The rubber raw material can be natural rubber or synthetic rubber or a combination thereof. The additives include color masterbatches, which are prepared, mixed and added according to actual need for coloring the elastic zip tie to be produced; a foaming agent, which is prepared and added for foaming a polymeric material under control; vulcanization masterbatches, which are prepared, mixed and added according to an actual amount of sulfur to be contained in a polymeric material; and other functional materials, including but not limited to an anti-aging material, an anti-oxidizing material, a heat-resistant material, a fire-resistant material and the like. These functional materials are prepared, mixed and added according to the actual requirements in using the finished product of the elastic zip tie.

The strap 203 has a length, a width 2036 and a thickness, which can be differently decided according to actual need in use. The strap 203 has a front end 2033 and a tail end 2034, and an upper surface 2031 and an opposite lower surface 2032 extended between the front end 2033 and the tail end 2034. The thickness of the strap 203 is defined by between the upper surface 2031 and the lower surface 2032; and the width 2036 of the strap 203 is defined by between two opposite lateral surfaces thereof.

The flexible grips 20 are axially spaced on the strap 203 in a longitudinal direction thereof, i.e. along a length extended from the front end 2033 to the tail end 2034 of the strap 203. Each of the flexible grips 20 includes a pair of flexible jaws 21, 22, which are projected from the upper and lower surfaces of the strap 203 extended between the front end 2033 and the tail end 2034. In the first preferred embodiment as illustrated in FIG. 2A, the pair of flexible jaws 21, 22 in each of the flexible grips 20 are defined as a first flexible jaw 21 and a second flexible jaw 22 projected from the upper surface 2031 and the lower surface 2032, respectively, of the strap 203.

The first and the second flexible jaws 21, 22 are bendable and elastically restorable. Each of the first flexible jaws 21 has a first bottom 211 integrally connected to the upper surface 2031 and a first tip 212 being a free end upwardly projected from the upper surface 2031; and similarly, each of the second flexible jaws 22 has a second bottom 221 integrally connected to the lower surface 2032 and a second tip 222 being a free end downwardly projected from the lower surface 2032. The first bottom 211 and the first tip 212 together define the height by which the first flexible jaw 21 projects from the upper surface 2031; and the second bottom 221 and the second tip 222 together define the height by which the second flexible jaw 22 projects from the lower surface 2032.

Further, the first and the second bottom 211, 221 have a thickness larger than that of the first and the second tip 212, 222, respectively, so that the first and the second flexible jaw 21, 22 have a substantially triangular cross section when being viewed from two lateral sides of the strap 203. With this design, the first flexible jaws 21 and the second flexible jaws 22 are more easily bendable and can elastically restore to their upright position more quickly to thereby provide an increased grip force.

Any two adjacent axially-spaced flexible grips 20 together define at least one holding space between them. In the illustrated first preferred embodiment, a first holding space 24 is defined by between two adjacent axially-spaced first flexible jaws 21, and a second holding space 25 is defined by between two adjacent axially-spaced second flexible jaws 22. The first holding space 24 each has a longitudinal length defined by a distance between the two adjacent first flexible jaws 21; and the second holding space 25 each has a longitudinal length defined by a distance between the two adjacent second flexible jaws 22.

The head 201 is integrally formed at the front end 2033 of the strap 203, and has a first lateral side 2011 and an opposite second lateral side 2012. The first and the second lateral side 2011, 2012 together define a head thickness 2015 between them. The head thickness 2015 is substantially larger than the longitudinal length of the first and the second holding space 24, 25. In the illustrated first preferred embodiment, the head thickness 2015 is 1.15 times as large as the longitudinal length of the first and the second holding space 24, 25. Further, the head thickness 2015 is equal to the width 2036 of the strap 203. The head 201 has an opening 2013 extended through the head 201 in its thickness direction, i.e., extended from the first lateral side 2011 to the second lateral side 2012. The opening 2013 has a height slightly larger than the thickness of the strap 203 but smaller than a sum of the strap thickness and the overall projection height of the paired first and second flexible jaws 21, 22; and has a longitudinal width slightly larger than the strap width 2036.

Figure 3A:
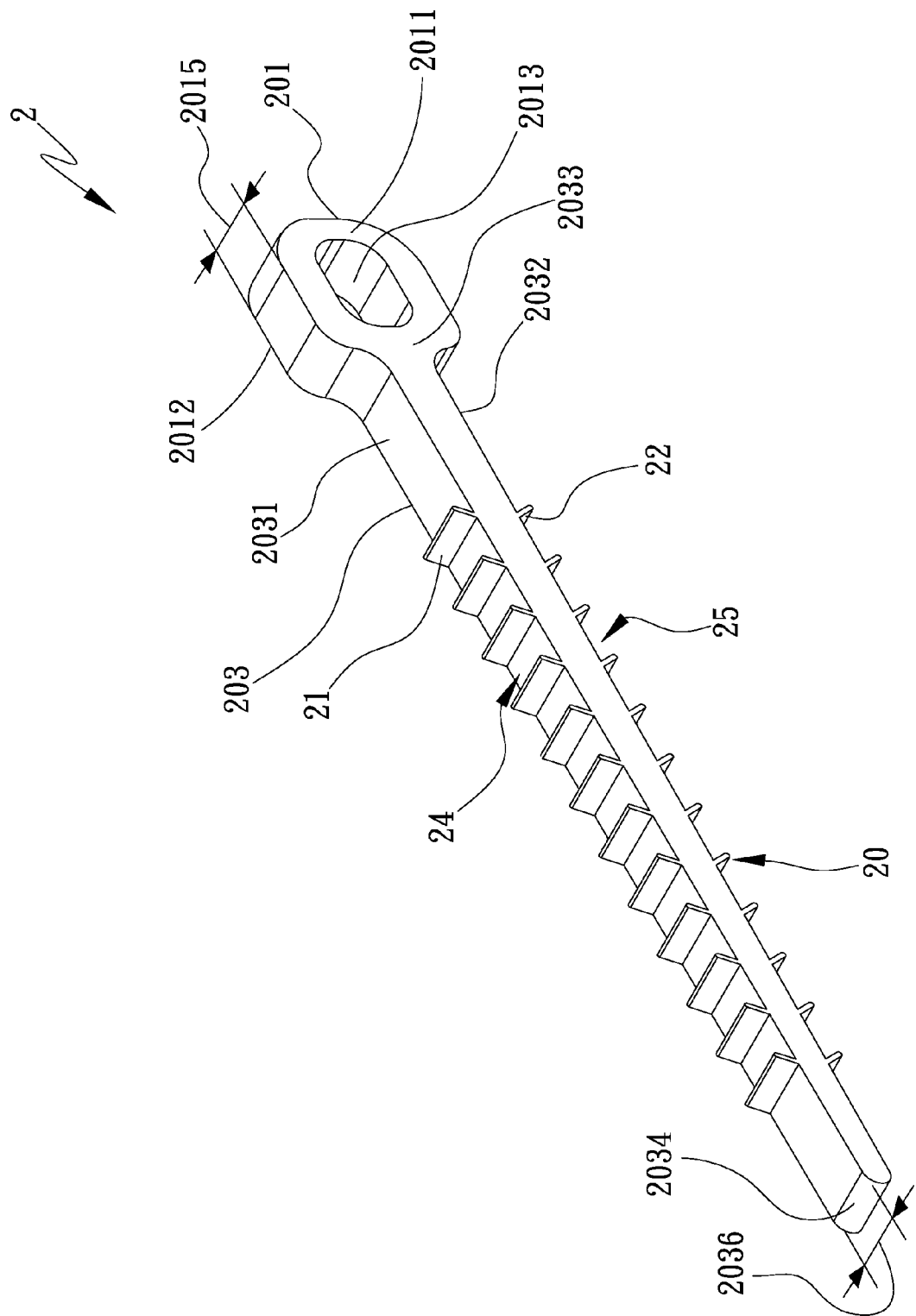
FIG. 3A is a perspective view of an elastic zip tie according to a second preferred embodiment of the present invention.
Figure 3B:
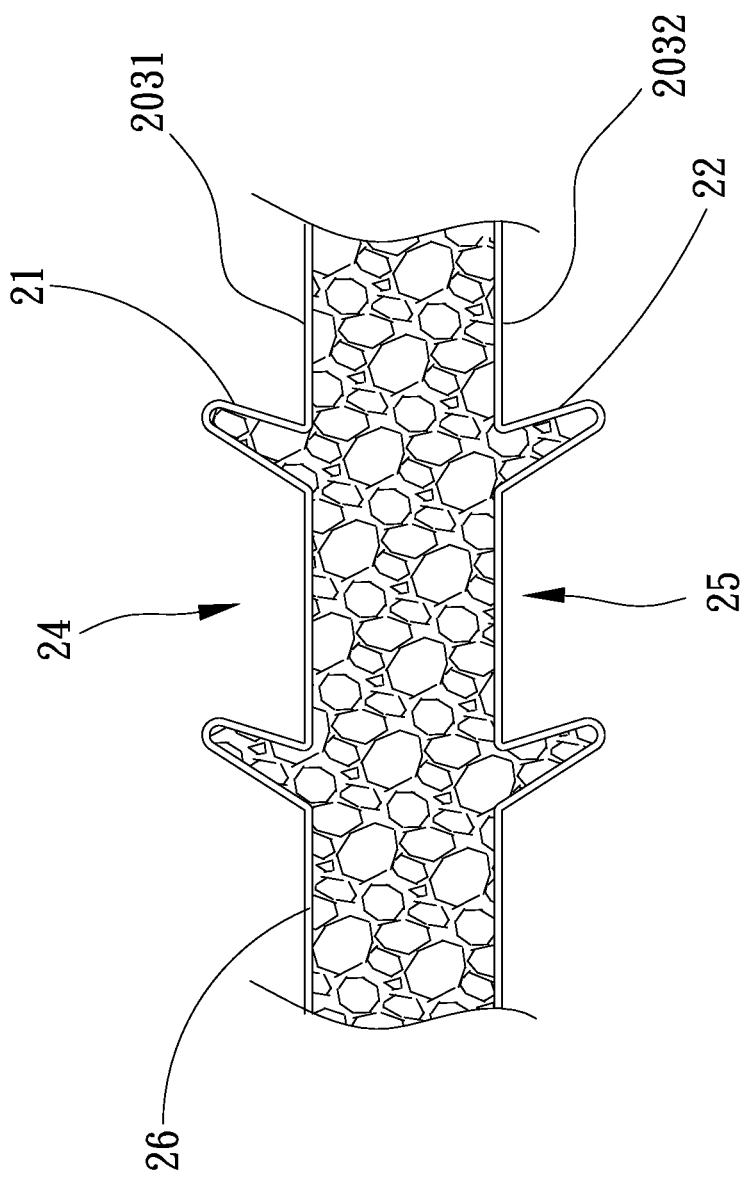
FIG. 3B is a fragmentary longitudinal sectional view of FIG. 3A.

In the first preferred embodiment illustrated in FIGS. 2A and 2B, the first and the second flexible jaws 21, 22 are perpendicularly projected from the upper and the lower surface 2031, 2032, respectively. However, it is understood the flexible jaws 21, 22 are not necessarily perpendicular to the upper and the lower surface 2031, 2032, respectively. In a second preferred embodiment as shown in FIGS. 3A and 3B, the first and the second flexible jaws 21, 22 are forward inclined while projecting from the upper and the lower surface 2031, 2032 of the strap 203, respectively.

Figure 4A:
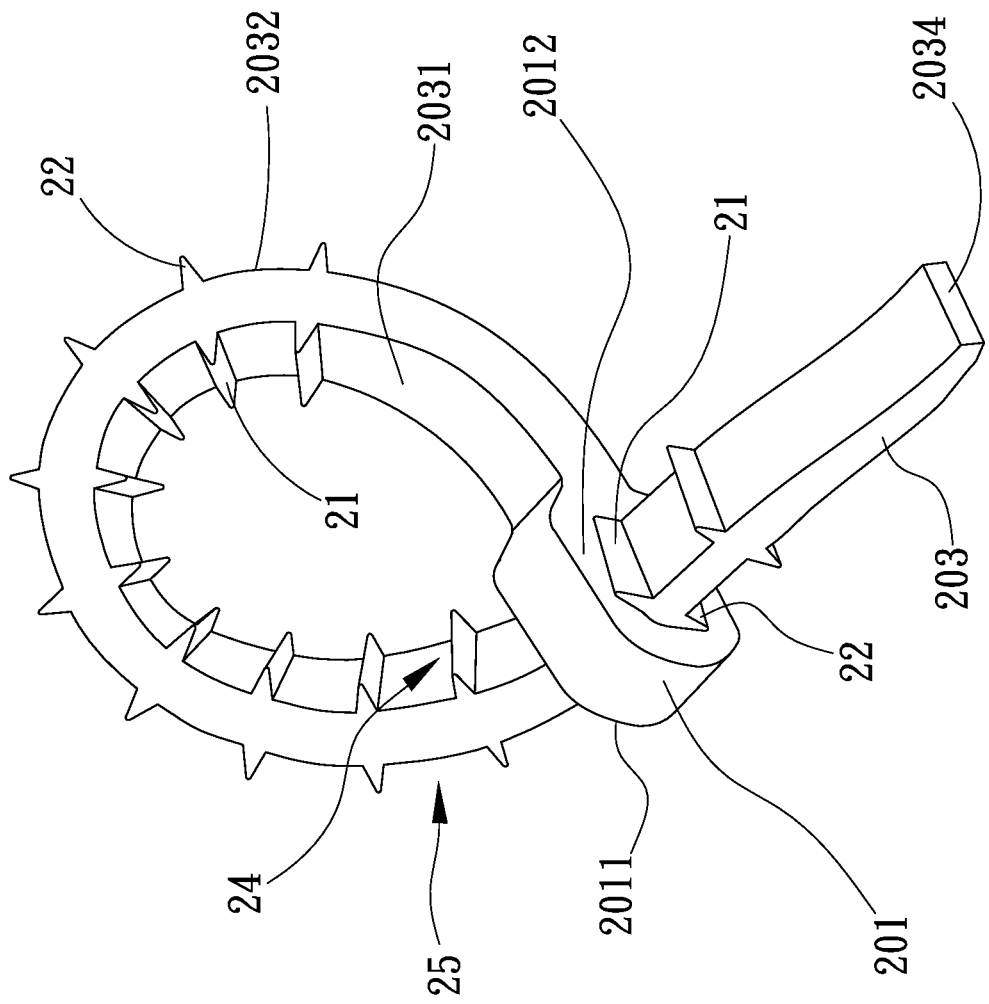
FIG. 4A is a perspective view showing the manner of using the elastic zip tie of the present invention.
Figure 4B:
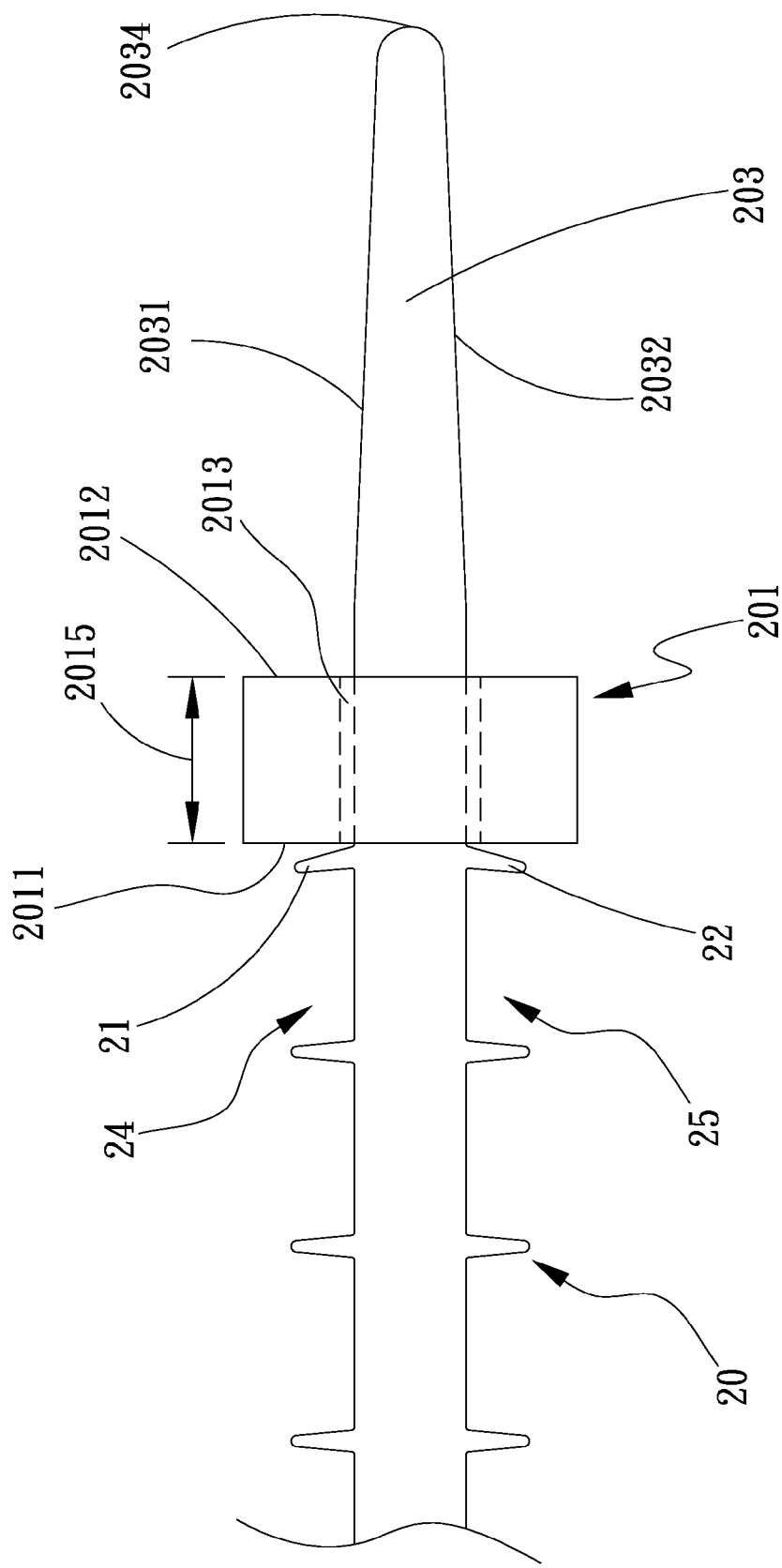
FIGS. 4B, 4C and 4D sequentially show how a head of the elastic zip tie is moved into two corresponding holding spaces defined between two adjacent axially-spaced flexible grips on a strap of the elastic zip tie.
Figure 4C:
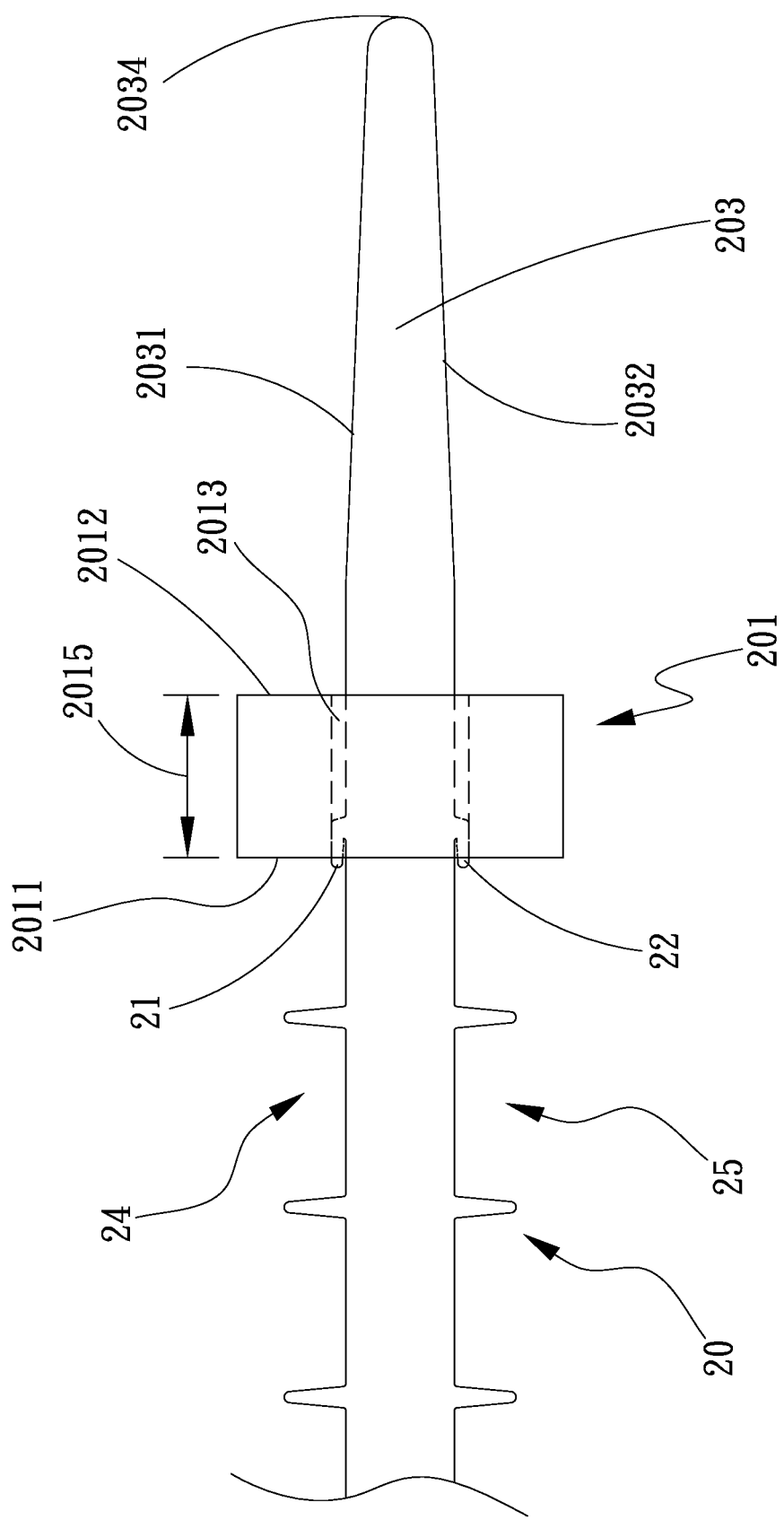
Figure 4D:
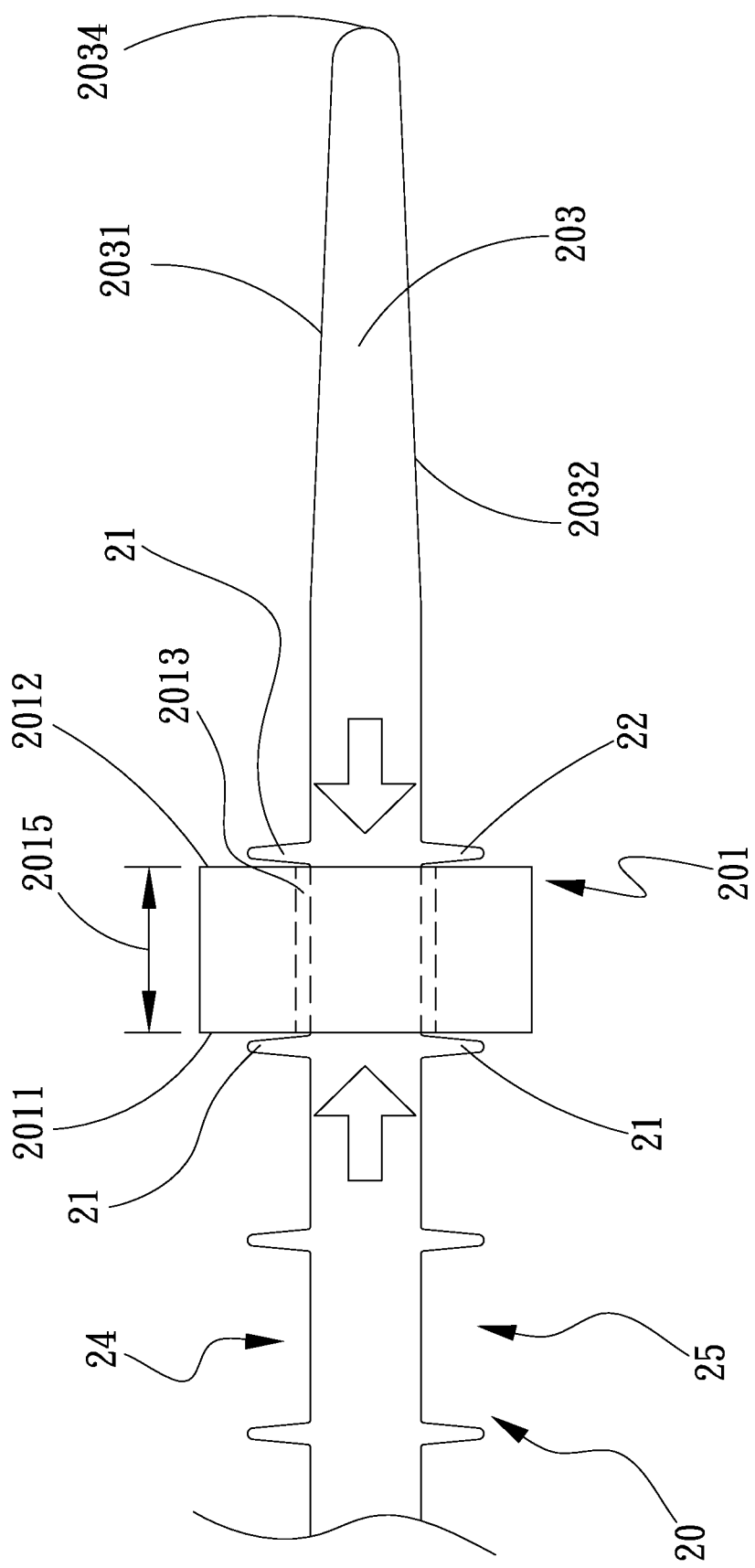

FIG. 4A is a perspective view showing the manner of using the elastic zip tie of the present invention; and FIGS. 4B to 4D sequentially show how the head 201 of the elastic zip tie is moved into two corresponding holding spaces 24, 25 defined between two adjacent axially-spaced flexible grips 20 on the strap 203 of the elastic zip tie. Please refer to FIGS. 4A to 4D. To use the elastic zip tip of the present invention, first extend the tail end 2034 of the strap 203 through the opening 2013 of the head 201 from the first lateral side 2011 to the second lateral side 2012 thereof, and then pull the tail end 2034 of the strap 203 forward for the head 201 to rest on the strap 203 between two desired adjacent axially-spaced flexible grips 20, such that the two pairs of flexible jaws 21, 22 constituting the two adjacent flexible grips 20 are pressed against the first and the second lateral side 2011, 2012 of the head 201 to firmly hold the latter in two corresponding first and second holding spaces 24, 25 defined between the two adjacent flexible grips 20. In this manner, the elastic zip tie 2 is formed into a loop, as shown in FIG. 4A, to fasten around a bundle of objects (not shown in FIG. 4A). According to the present invention, the paired first and second flexible jaws 21, 22 of the multiple flexible grips 20 are bendable and elastically restorable. When the strap 203 is pulled at the tail end 2034 to move through the opening 2013 of the head 201 for forming a loop or adjusting the size thereof, the pair of first and second flexible jaws 21, 22 originally uprightly located at the first lateral side 2011 of the head 201, as shown in FIG. 4B, will be interfered and elastically bent rearward by the first lateral side 2011 of the head 201, allowing the strap 203 and the flexible grip 20 to pass through the opening 2013, as shown in FIG. 4C. When the strap 203 is further pulled to fully move the pair of bent first and second flexible jaws 21, 22 through the opening 2013, the first and second flexible jaws 21, 22 now located at the second lateral side 2012 of the head 201 are no longer interfered by the opening 2013 and elastically restored to their upright position, as shown in FIG. 4D. At this point, the head 201 is located in the corresponding first and second holding spaces 24, 25 with the first flexible jaws 21 located at a front and a rear end of the first holding space 24 and the second flexible jaws 22 located at a front and a rear end of the second holding space 25 firmly pressing against the first and the second lateral side 2011, 2012 of the head 201 to effectively hold the head 201 in place.

According to the present invention, the head 201 has a thickness 2015 being 1.15 times as large as the longitudinal length of the first and the second holding space 24, 25. With this design, the head 201 held in the first and the second holding space 24, 25, as shown in FIG. 4D, would cause a local elastic extension of the strap 203 between the two flexible grips 20 located immediately before and behind the first and the second holding space 24, 25. Due to the nature of foam rubber, the two flexible grips 20 will produce two elastic restoring forces that are respectively acted on the first and the second lateral side 2011, 2012 of the head 201 at the same time. That is, the two pair of first and second flexible jaws 21, 22 constituting the two flexible grips 20 will firmly press against the first and the second lateral side 2011, 2012 of the head 201 to hold the latter in place.

FIG. 5 shows the elastic zip tie 2 of the present invention is used to bundle different objects 6. As having been mentioned above, the first and the second flexible jaws 21, 22 are bendable and elastically restorable. The flexible jaws on one surface of the strap 203 that faces against the bundled objects 6, either the first flexible jaws 21 on the upper surface 2031 of the strap 203 or the second flexible jaws 22 on the lower surface 2032 of the strap 203, are interfered with and elastically bent by the objects 6 under a binding force of the elastic zip tie 2. According to Newton's Third Law of Motion, for every action force there is an equal and opposite reaction force. Therefore, the first flexible jaws 21 or the second flexible jaws 22 interfered with and bent by the objects 6 will produce an elastic restoring force equal to the binding force of the elastic zip tie 2 to act on the objects 6, giving the elastic zip tie 2 an enhanced ability to bundle the objects 6 and prevent the latter from slipping. In the illustrated preferred embodiment of the present invention as shown in FIG. 5, the flexible jaws facing against the bundled objects 6 are the first flexible jaws 21 on the upper surface 2031 of the strap 203.

Figure 6:
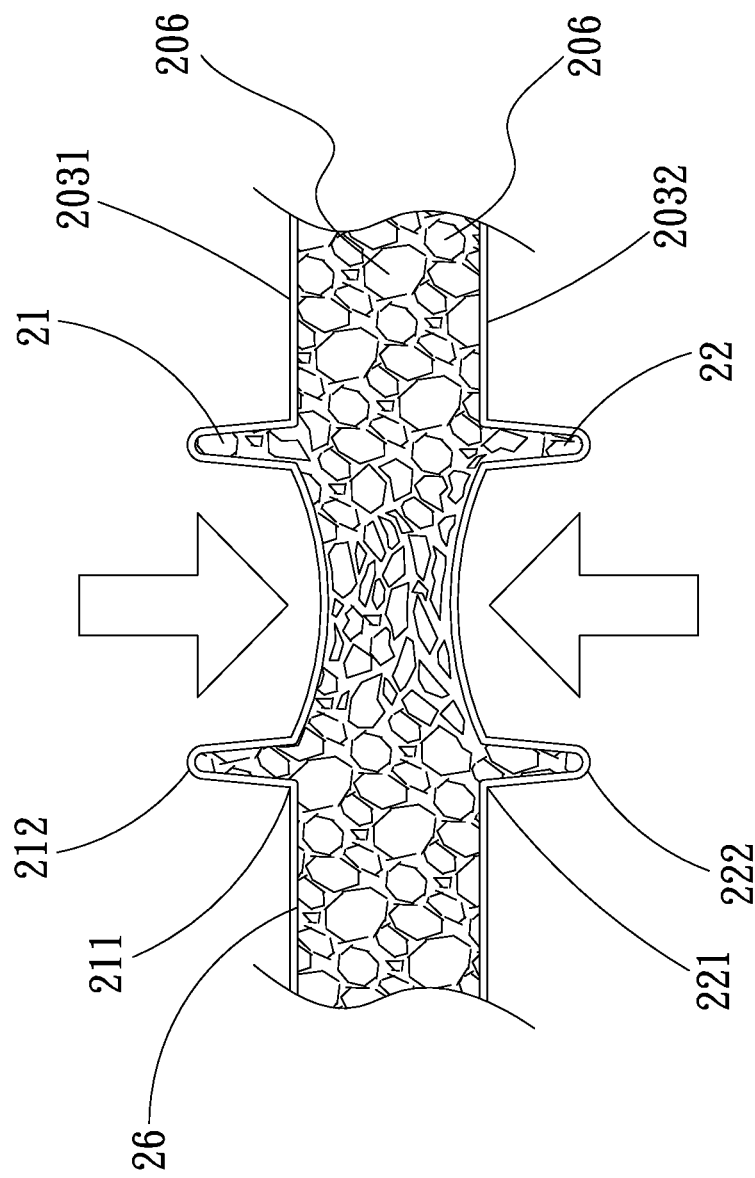
FIG. 6 is a fragmentary longitudinal sectional view showing the elastic zip tie of the present invention is compressible.

FIG. 6 is a fragmentary longitudinal sectional view showing the elastic zip tie 2 of the present invention is compressible. Since the elastic zip tie 2 is an elastomeric product integrally molded from foam rubber and internally contains a plurality of micropores 206, it is pliable and plastic. That is, the elastic zip tie 2 is deformable when being compressed by an externally applied force and quickly elastically restores to its original shape when the external force is removed. With the pliable elastic zip tie 2 of the present invention, the bundled objects 6 are protected against damaged surfaces. The porous and deformable elastic zip tie 2 also provides good buffering and shock-absorbing effect to protect the bundled objects 6 against damage in case of unexpected falling or compressing.

Figure 7:
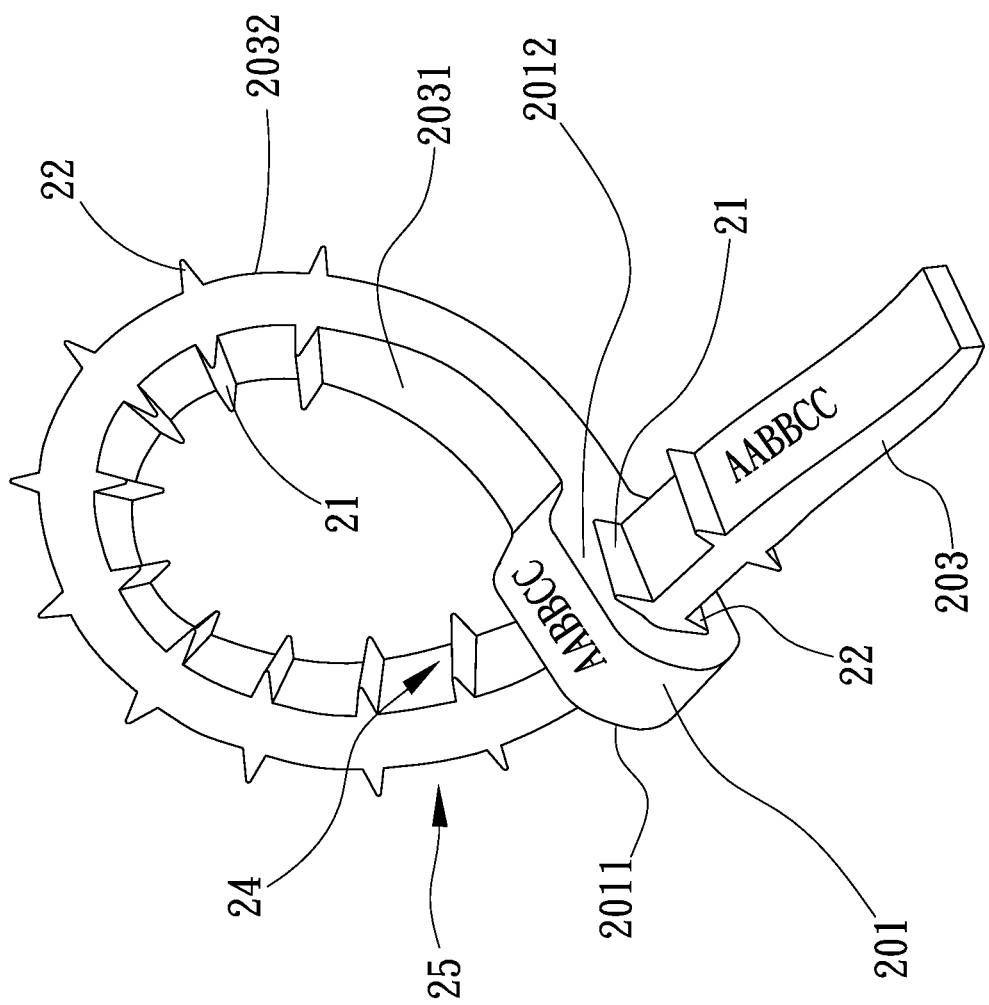
FIG. 7 is a perspective view showing the elastic zip tie of the present invention can be printed or marked on a solid rubber surface skin thereof.

FIG. 7 is a perspective view showing the elastic zip tie of the present invention can be printed or marked on an outer surface thereof. Please refer to FIG. 7 and FIGS. 2B, 3B and 6 at the same time. The upper surface 2031 and the lower surface 2032 of the strap 203 and the outer surfaces of the head 201 are respectively formed into a solid rubber surface skin 26. In a foaming process for manufacturing the elastic zip tie 2, sulfur is added to the rubber raw material so that the surfaces of the elastic zip tie 2 are vulcanized earlier than the interior from the solid rubber surface skin 26, which is not fully foamed to provide a smooth but non-glossy surface suitable for printing, writing or marking thereon for identification purpose.

Unlike the conventional zip ties that include a retaining head as a fastener to hold a strap in place, the elastic zip tie of the present invention is characterized by a strap 203 provided with a plurality of flexible grips 20 for holding a head 201 in place on the strap 203. Each of the flexible grips 20 includes a pair of flexible jaws 21, 22, which are bendable and elastically restorable to effectively firmly hold the bundled objects and stop them from slipping. Since the elastic zip tie 2 of the present invention is integrally molded from foam rubber and internally contains a plurality of micropores 206, it has good elastic restorability and can quickly restore to its original shape after being stretched, twisted or otherwise deformed. The elastic zip tie 2 is pliable and can spring back from compression, and can therefore buffer the external force acted on the bundled objects and protect them against surface damage.

The present invention has been described with some preferred embodiments thereof and it is understood that many changes and modifications in the described embodiments can be carried out without departing from the scope and the spirit of the invention that is intended to be limited only by the appended claims.

What is claimed is:
1. An elastic zip tie, comprising:
a strap having a width and a length selected according to actual need in use, and a front end and an opposite tail end;
a plurality of flexible grips being axially spaced on the strap in a longitudinal direction thereof; each of the flexible grips including a pair of bendable and elastically restorable flexible jaws, which are respectively projected from two opposite surfaces of the strap extended between the front end and the tail end; at least one holding space being defined by between any two adjacent ones of the axially-spaced flexible grips, and the holding space each having a longitudinal length defined by a distance between the two adjacent flexible grips; and
a head being integrally formed at the front end of the strap and having two opposite lateral sides, which together define a head thickness between them, and the head thickness being substantially larger than the longitudinal length of the holding space; the head having an opening extended through the head in its thickness direction for the tail end of the strap to extend therethrough, so that the head can be rested on the strap in a selected holding space with the two opposite lateral sides of the head being pressed by between two pairs of flexible jaws constituting the two flexible grips immediately located before and behind the selected holding space, making the head firmly held in the holding space; and
wherein the strap, the flexible grips and the head are integrally molded from foam rubber, so that the elastic zip tie is an elastomeric product internally containing a plurality of micropores.

2. The elastic zip tie as claimed in claim 1, wherein the paired flexible jaws respectively have a bottom integrally connected to one of the two opposite surfaces of the strap and a tip being a free end; and the bottom each having a thickness larger than that of the tip.

3. The elastic zip tie as claimed in claim 1, wherein all the paired flexible jaws have a substantially triangular cross section.

4. The elastic zip tie as claimed in claim 1, wherein all the paired flexible jaws are perpendicularly projected from the two opposite surfaces of the strap.

5. The elastic zip tie as claimed in claim 1, wherein all the paired flexible jaws are forward inclined while projecting from the two opposite surfaces of the strap.

6. The elastic zip tie as claimed in claim 1, wherein the foam rubber is composed of a rubber raw material, calcium and carbon containing compounds, fillers and additives.

7. The elastic zip tie as claimed in claim 1, wherein the head thickness is 1.15 times as large as the longitudinal length of the holding space.

8. The elastic zip tie as claimed in claim 1, wherein the strap and the head have surfaces that are formed into a solid rubber surface skin suitable for printing, writing or marking thereon for identification purpose.

9. An elastic zip tie, comprising:
a strap having a width and a length selected according to actual need in use;
a front end and an opposite tail end; and an upper surface and an opposite lower surface extended between the front end and the tail end;
a plurality of flexible grips being axially spaced on the strap in a longitudinal direction thereof; each of the flexible grips including a bendable and elastically restorable first flexible jaw, which is projected from the upper surface of the strap, and a bendable and elastically restorable second flexible jaw, which is projected from the lower surface of the strap; a first holding space being defined by between any two axially adjacent ones of the first flexible jaws, and the first holding space each having a longitudinal length defined by a distance between the two adjacent first flexible jaws; and a second holding space being defined by between any two axially adjacent ones of the second flexible jaws, and the second holding space each having a longitudinal length defined by a distance between the two adjacent second flexible jaws; and
a head being integrally formed at the front end of the strap and having a first lateral side and an opposite second lateral side, which together define a head thickness between them, and the head thickness being substantially larger than the longitudinal length of the holding space; the head having an opening extended through the head in its thickness direction for the tail end of the strap to extend therethrough, so that the head can be rested on the strap in a pair of first and second holding spaces defined between two selected adjacent ones of the flexible grips, such that the opposite first and second lateral sides of the head are pressed by between two pairs of first and second flexible jaws constituting the two selected adjacent flexible grips, making the head firmly held in the paired first and second holding spaces; and
wherein the strap, the flexible grips and the head are integrally molded from foam rubber, so that the elastic zip tie is an elastomeric product internally containing a plurality of micropores.

10. The elastic zip tie as claimed in claim 9, wherein each of the first flexible jaws has a first bottom integrally connected to the upper surface of the strap and a first tip being a free end, and each of the second flexible jaws has a second bottom integrally connected to the lower surface of the strap and a second tip being a free end; and the first and second bottoms having a thickness larger than that of the first and second tips.

11. The elastic zip tie as claimed in claim 9, wherein the first and the second flexible jaws all have a substantially triangular cross section.

12. The elastic zip tie as claimed in claim 9, wherein the first and the second flexible jaws are perpendicularly projected from the upper and the lower surface of the strap, respectively.

13. The elastic zip tie as claimed in claim 9, wherein the first and the second flexible jaws are forward inclined while projecting from the upper and the lower surface of the strap, respectively.

14. The elastic zip tie as claimed in claim 9, wherein the foam rubber is composed of a rubber raw material, calcium and carbon containing compounds, fillers and additives.

15. The elastic zip tie as claimed in claim 9, wherein the head thickness is 1.15 times as large as the longitudinal length of the holding space.

16. The elastic zip tie as claimed in claim 9, wherein the upper and the lower surface of the strap and outer surfaces of the head are formed into a solid rubber surface skin suitable for printing, writing or marking thereon for identification purpose.

* * * * *